United States Patent
Han et al.

(10) Patent No.: US 7,970,612 B2
(45) Date of Patent: Jun. 28, 2011

(54) METHOD AND APPARATUS FOR AUTOMATICALLY COMPLETING TEXT INPUT USING SPEECH RECOGNITION

(75) Inventors: Ick-sang Han, Yongin-si (KR); Joong-mi Cho, Suwon-si (KR); Yoon-kyung Song, Seoul (KR); Byung-kwan Kwak, Yongin-si (KR); Nam-hoon Kim, Yongin-si (KR); Ji-yeun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 816 days.

(21) Appl. No.: 12/004,428

(22) Filed: Dec. 21, 2007

(65) Prior Publication Data

US 2009/0055174 A1    Feb. 26, 2009

(30) Foreign Application Priority Data

Aug. 20, 2007 (KR) .................. 10-2007-0083450

(51) Int. Cl.
*G10L 15/00* (2006.01)
*G10L 15/04* (2006.01)

(52) U.S. Cl. .......... 704/251; 704/231; 704/235
(58) Field of Classification Search .......... 704/231–257
See application file for complete search history.

(56) References Cited

U.S. PATENT DOCUMENTS

| 7,010,490 B2* | 3/2006 | Brocious et al. ............ 704/275 |
| 7,363,224 B2* | 4/2008 | Huang et al. ............... 704/252 |
| 2003/0115057 A1* | 6/2003 | Junqua et al. ............. 704/235 |

* cited by examiner

*Primary Examiner* — David R Hudspeth
*Assistant Examiner* — Samuel G Neway
(74) *Attorney, Agent, or Firm* — Staas & Halsey LLP (57) ABSTRACT

Provided are a method and apparatus for automatically completing a text input using speech recognition. The method includes: receiving a first part of a text from a user through a text input device; recognizing a speech of the user, which corresponds to the text; and completing a remaining part of the text based on the first part of the text and the recognized speech. Therefore, accuracy of the text input and convenience of the speech recognition can be ensured, and a non-input part of the text can be easily input based on the input part of the text and the recognized speech at a high speed.

9 Claims, 7 Drawing Sheets

- PREVIOUS AUTO COMPLETED TEXT
- TEXT INPUT THROUGH KEYPAD
- CURRENT POSITION OF CURSOR
- DICTATION POINT

LOADED TEXT : SORRY HOW ABOUT

FIG. 5C

LOADED TEXT : SORRY HOW ABOUT

WEIGHTED VALUE [W(t)]

DICTATION: HOW ABOUT 4 O'CLOCK TOMORROW

HOW  ABOUT  WORD SEARCH NET IS GENERATED FROM LANGUAGE MODELS

| HOW ABOUT | 4 O'CLOCK TOMORROW |

| ABOUT | 4 O'CLOCK TOMORROW |

| HOW ABOUT | 4 CLERKS TOMORROW |

| ABOUT | 4 CLOCKS TOMORROW |

⋮

METHOD AND APPARATUS FOR AUTOMATICALLY COMPLETING TEXT INPUT USING SPEECH RECOGNITION

CROSS-REFERENCE TO RELATED PATENT APPLICATIONS

This application claims the benefit of Korean Patent Application No. 10-2007-0083450, filed on Aug. 20, 2007, in the Korean Intellectual Property Office, the disclosure of which is incorporated herein in its entirety by reference.

BACKGROUND OF THE INVENTION

1. Field of the Invention

The present invention relates to a text input auto completion method and apparatus for automatically completing text input using speech recognition, and more particularly, to a method and an apparatus for automatically completing text input using a text input device such as a keypad and speech recognition in a device requiring a text input function.

2. Description of the Related Art

In order to use a short message service (SMS) in conventional mobile terminals or to input schedules in personal digital assistants (PDAs), text to be input should be input in units of letters using a keypad installed in the mobile terminal or a screen keyboard realized in the PDA. In portable mobile personal computers (PCs) such as ultra-mobile personal computers (UMPCs), it is easy to surf the web, send e-mails, and generate documents as in desktop PCs, and thus, of the requirement for inputting letters is increasing. Here, text includes words and sentences that are larger units than syllables, and hereinafter, the text will be referred to as a piece of writing.

In this text input method using direct input, letters can be input exactly; however, it takes a lot of time to input the text because the text must be input letter-by-letter, and it is inconvenient because all of the text must be directly input. In particular, portable devices such as mobile terminals, PDAs, and UMPCs are small, and thus, it is very inconvenient to input letters using a keypad or keyboard.

On the other hand, besides the direct input method using a keypad or keyboard, a speech recognition method can be used, in which text can be input by recognizing the voice of a user. Speech recognition technology is continuously developing, and text corresponding to the speech can be input to a device by recognizing the speech of the user using various language models, without directly inputting the text.

However, regardless of the above convenience, a recognition rate of continuous speech such as dictation is lowered, and thus, the performance of speech recognition is not good enough to be used in an e-mail sending service or SMS. If continuous speech is recognized by speech recognition technology, the recognized speech must be repeatedly corrected due to the low recognition rate, and thus, it is inconvenient to input text in a portable device requiring fast input performance. In addition, in conventional speech recognition technology, speech is recognized first, and then, the recognized sentence must be identified to be input or the recognition of the speech must be repeated. Therefore, the inputting operation and the speech recognition are separately performed, and thus, it is impossible to input the text naturally.

Recently, digital TVs such as Internet protocol TVs (IPTVs) have been commercialized, and thus, these TVs can be connected to the Internet, and requirements of various text input systems are being increased. In particular, unlike conventional TVs, IPTVs can connect to web pages through the Internet, and text can be input as in PCs. In order to input text into a TV, a keypad mounted on a conventional remote controller can be used or a screen keyboard realized on a screen of the TV can be used. However, the above methods also have the same disadvantages and inconveniences as the direct text inputting method described above.

SUMMARY OF THE INVENTION

The present invention provides a method and apparatus for automatically completing a text input, which can input a text easily at a high speed, by overcoming the inconvenience of a conventional text input method which is used to input text directly letter-by-letter and by overcoming a low speech recognition rate and inconvenience generated due to a strict orders or processes in speech recognition.

According to an aspect of the present invention, there is provided a method of automatically completing a text input, the method including: receiving a first part of a text from a user through a text input device; recognizing a speech of the user, which corresponds to the text; and completing a remaining part of the text based on the first part of the text and the recognized speech.

According to another aspect of the present invention, there is provided a computer readable recording medium having embodied thereon a computer program for executing the method of automatically completing a text input.

According to another aspect of the present invention, there is provided an apparatus for automatically completing a text input, the apparatus including: a text input unit receiving a first part of a text from a user through a text input device; a speech recognition unit recognizing a speech of the user, which corresponds to the text; and an auto completion unit completing a remaining part of the text based on the input first part of the text and the recognized speech.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, embodiments of the present invention will be described in detail with reference to accompanying drawings.

Figure 1:
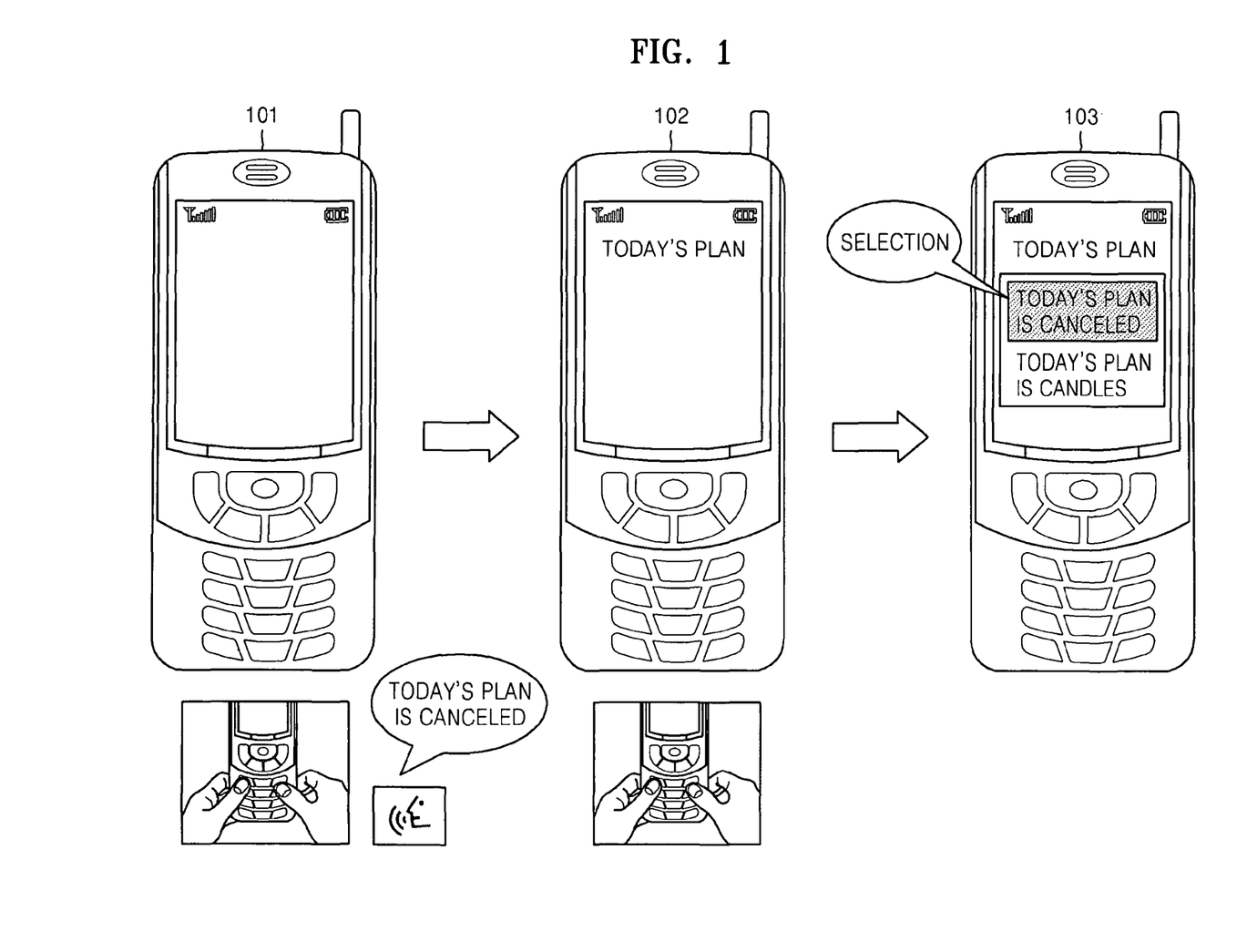
FIG. 1 is a diagram illustrating a method of automatically completing a text input using speech recognition.

FIG. 1 is a diagram illustrating a method of automatically completing a text input by using speech recognition when a user inputs text in order to use a short message service (SMS) of a mobile phone.

In 101, the user dictates "today's plan is cancelled" while inputting a word "today" using a keypad of the mobile phone. The text input and the dictation can be performed together in any order. That is, the text input of "today" can be performed first, the dictation of "today's plan is cancelled" can be performed first, or the text input and the dictation can be performed simultaneously.

In 102, a speech recognition unit of the mobile phone waits for a text of sufficient length to be input through the keypad. If the text is not input, the speech recognition unit waits for the text input. Then, if the input text "today" is determined to have sufficient length, speech recognition of the phrase "today's plan is cancelled" is performed based on the input text "today". That is, the text input and the speech recognition are separately performed, and the recognition of the continuous speech is performed based on the input text, and thus, the text input and the speech recognition can be performed without regarding to the timing order as shown in 101. Here, sufficient length means a predetermined length of the text that should be input for performing the speech recognition. The sufficient length can be preset according to characteristics of the language, or can be flexibly determined according to the language model that is obtained by processing massive amounts of speech data statistically. The user inputs the word "plan".

In FIG. 1, 103 shows the case where the speech recognition unit suggests a plurality of candidate sentences, and the user can select the phrase "today's plan is canceled" from the candidates "today's plan is canceled" and "today's plan is candles" to complete the text input automatically. The selection can be performed using an up button, a down button, or ok button in the keypad, or by touching a touch screen.

Figure 2:
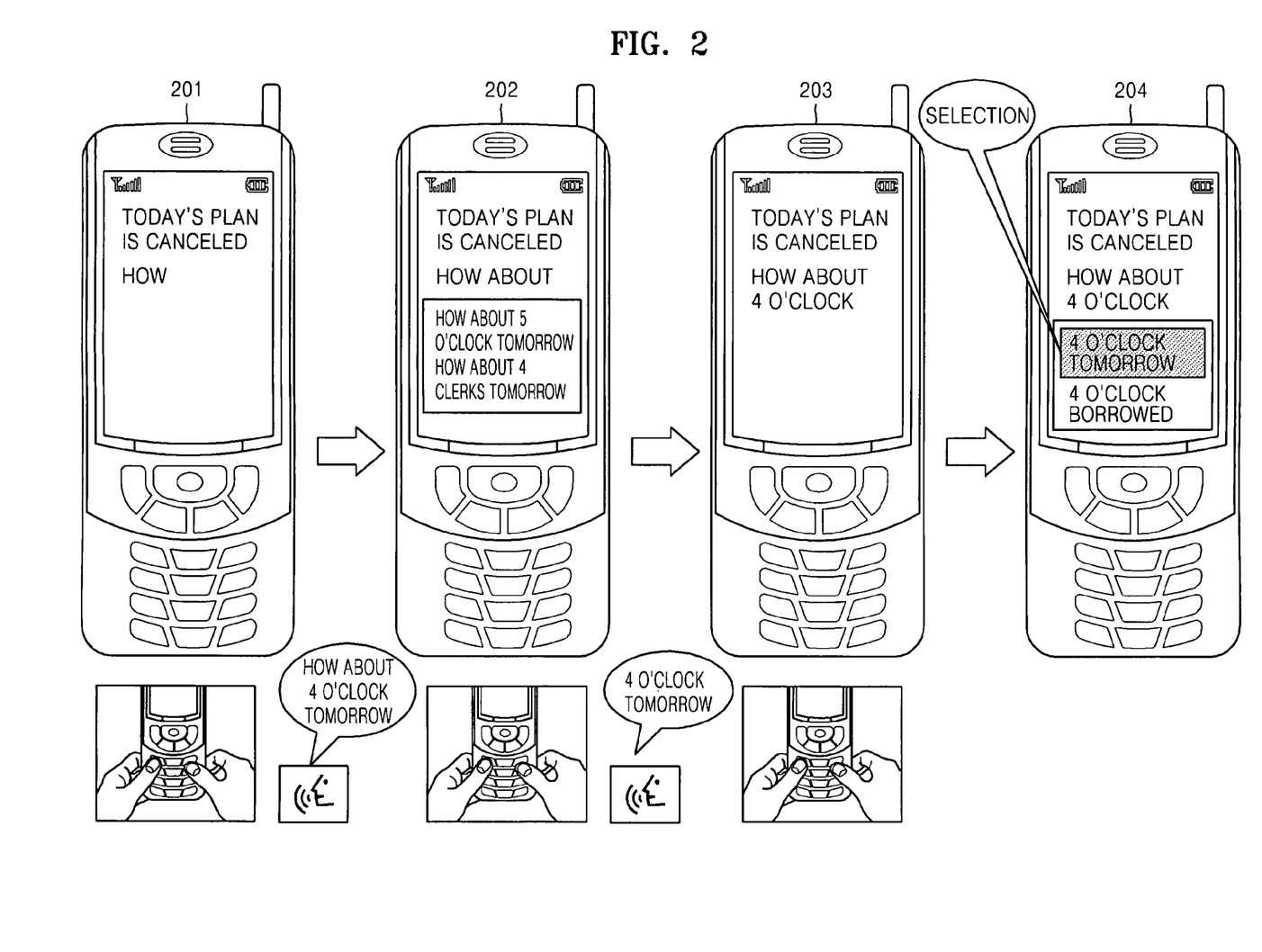
FIG. 2 is a diagram illustrating a method of automatically completing a text input by directly inputting letters in a case where speech recognition fails.

FIG. 2 is a diagram illustrating a process of completing text using text input when speech recognition fails. FIG. 2 shows a case where an additional text is input next to the text "today's plan is canceled" that is input in FIG. 1. In addition, when the user inputs the text using the text input function and the speech recognition, if the text desired by the user is not included in the plurality of candidates generated by the speech recognition unit, the auto completion is performed while pronouncing the corresponding text again after ignoring the plurality of candidates.

In 201, the user inputs a word "how" while dictating a phrase "how about 4 o'clock tomorrow". Like in FIG. 1, the inputting of the word "how" and the dictation of the phrase "how about 4 o'clock tomorrow" can be performed in any order.

In 202, the speech recognition unit waits for a sufficient length of the phrase to be input, and then, when the text "how about" is input, the speech recognition unit generates a plurality of candidates "how about 5 o'clock tomorrow" and "how about 4 clerks tomorrow", and displays the plurality of candidates on a display unit. In addition, during the operation of the speech recognition unit, the user additionally inputs the text "4 o'clock". However, the plurality of candidates generated by the speech recognition unit do not include the desired text "how about 4 o'clock tomorrow", and thus, the user ignores the plurality of candidates and dictates the phrase "4 o'clock tomorrow" again.

In 203, the speech recognition unit tries to recognize the speech based on the text "4 o'clock", during which the user additionally inputs the text "tomorrow".

In 204, the speech recognition unit displays the plurality of candidates "4 o'clock tomorrow" and "4 o'clock borrowed" generated based on the text "4 o'clock", and the user selects the correct phrase "4 o'clock tomorrow" to complete the text automatically.

Figure 3:
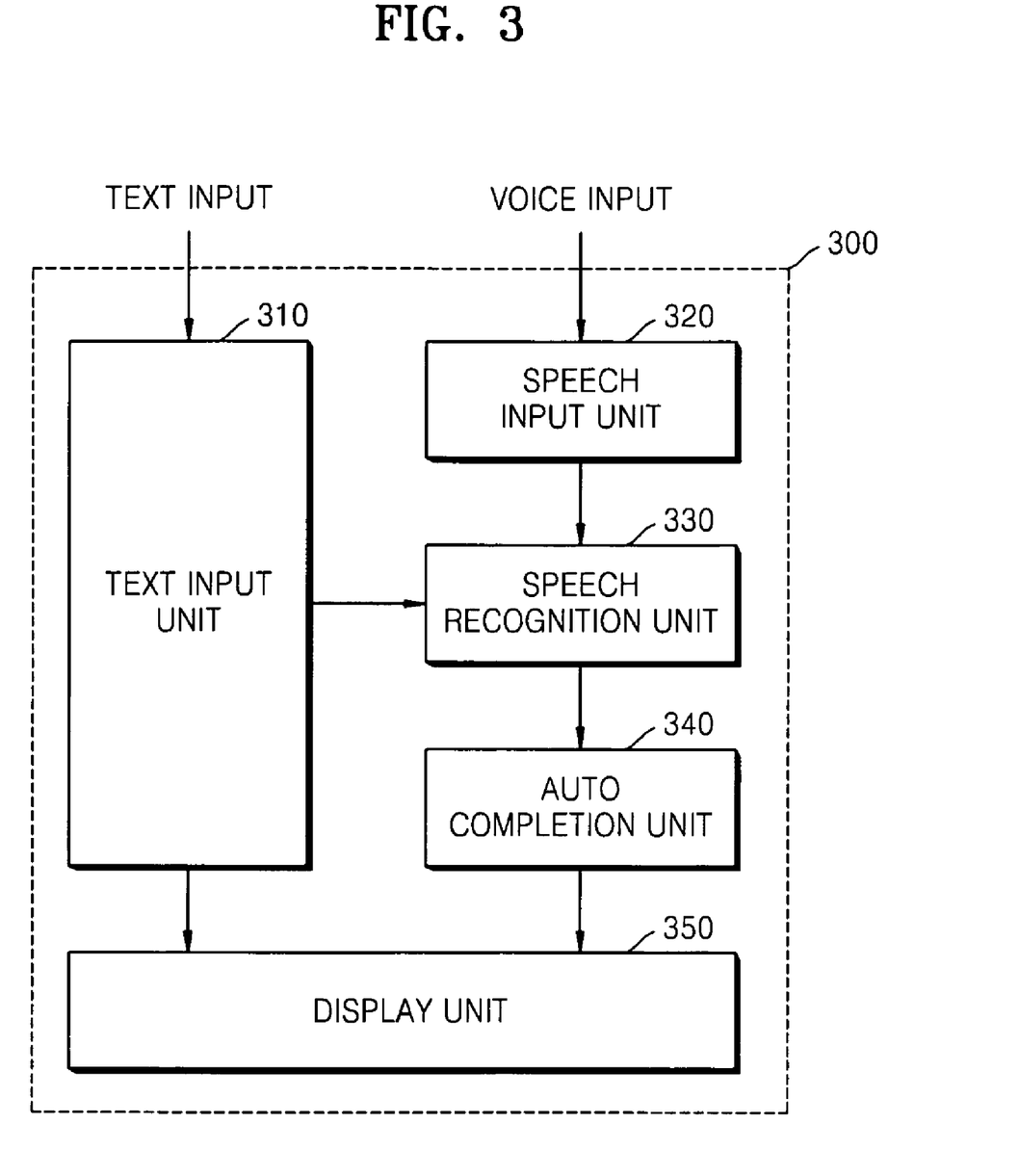
FIG. 3 is a block diagram of an apparatus for automatically completing a text input using speech recognition, according to an embodiment of the present invention.

FIG. 3 is a block diagram illustrating an apparatus 300 for automatically completing a text input using speech recognition, according to an embodiment of the present invention. The apparatus 300 according to the present embodiment can be a mobile phone, a PDA, or a UPMC, requiring a text input function. The apparatus 300 of the present embodiment includes two kinds of input units; that is, a text input unit 310 and a speech input unit 320. Hereinafter, the text input unit 310 and the speech input unit 320 will be described.

The text input unit 310 processes letters input by the user through a predetermined input unit such as a keypad, a keyboard, or a touch screen. The above input unit is a general letter input unit, by which the user can input text into the apparatus 300 in units of letters, and thus, the text input unit 310 can comprise a variety of text input units.

The speech input unit 320 receives speech of the user. The speech input unit 320 corresponds to the text input unit 310, and has functions such as removing noise after receiving sound from outside, detecting end-points representing beginning and end points of the object to be recognized in the input sound, determining whether the sound is noise or voice, and recognizing the speech using a speech recognition unit 330 when the sound is determined as the voice. The functions of the speech input unit 320 are well known to one of ordinary skill in the art, and thus, detailed descriptions thereof are not provided here.

On the other hand, if the user dictates a plurality of phrases, a recently dictated phrase is generally more important than a previously dictated phrase, or the user generally has an intention to replace a previously dictated phrase with a recently dictated phrase. Thus, if a new phrase is input when the speech recognition unit 330 is performing speech recognition of the previous phrase, the speech recognition of the previous phrase may be stopped and the speech recognition of the newly input phrase may be performed. This function can be used when the user wants to change the content of text that is to be input while dictating the phrase, that is, the user can dictate the new phrase that is to be input. For example, after the user pronounces the sentence "please check the mails" that is input into the speech input unit 320 and the speech recognition unit 330 tries to recognize the phrase if the user changes his mind and dictates a new phrase "I will check the mails", the speech recognition of the previous phrase is stopped and the speech recognition unit 330 tries to recognize the newly input phrase. As described above, in order for a phrase that is input later to replace a previously input phrase, the phrase must be dictated before the speech recognition of the previously input phrase is completed.

The speech recognition unit 330 tries to recognize the voice input into the speech input unit 320 based on the text input in the text input unit 310. The speech recognition unit 330 loads the input text from the text input unit 310, and determines the text to be recognized. All of the loaded text can be used in the speech recognition operation; however, in a case where the text input operation and the speech recognition are repeated a plurality of times, the speech recognition can be performed with respect to a part of the recent text that corresponds to the latest dictation, not all of the input text. Therefore, the text, from which the speech recognition starts, needs to be determined.

Next, it is determined whether the text is long enough to perform the continuous speech recognition operation. If the loaded text is determined to be too short to perform the continuous speech recognition operation, the continuous speech recognition is not performed until sufficient length of the text is input. For example, the sufficient length for recognizing the text can be a phoneme, a syllable, or a few words; however, a lot of words may be suitable for the continuous speech recognition like in the present embodiment. The sufficient length can be fixed in advance, or can be variable according to a usage environment of the apparatus 300 or the language model. If the text has the sufficient length, the continuous speech recognition is performed. The continuous speech recognition can be performed according to a predetermined letter selection rule, which will be described in more detail later.

On the other hand, the language model used in the continuous speech recognition is important to improve the speech recognition rate. The language model is constructed by processing a massive amount of speech data of everyday language statistically. Therefore, when the language model is applied in the continuous speech recognition, a text message history of the user or commonly used words of the user can be used. Otherwise, if the text input by the user is a response to an e-mail or a short message, or is used in Internet chatting, the text sent by a counterpart can be used again, and thus, the language model can be flexible according to the user and the function of the message.

When the continuous speech recognition is completed, the speech recognition unit 330 generates a plurality of candidates so that the user can select one of the phrases. The plurality of candidates includes a predetermined number of phrases that are determined to be similar to the dictation of the user as a result of the speech recognition. The plurality of candidates can include an appropriate number of phrases 300 in order of similarity, according to the characteristics of the apparatus. If the apparatus 300 is a mobile phone having a display unit 350 that is relatively small, two or three candidates can be appropriate, and if the apparatus 300 is a UPMC having a display unit 350 that is relatively large, five or more candidates can be provided.

An auto completion unit 340 locates the phrase selected by the user from the plurality of candidates provided by the speech recognition unit 330 on a predetermined position of the text. The predetermined position can be next to the latest recognized and completed text, or can be a position of a cursor displayed on the display unit 350. In more detail, the auto completion unit 340 displays the plurality of candidates generated by the speech recognition unit 330 on the display unit 350 of the apparatus 300, and the user selects one of the candidates. The user can select one of the candidates by using the keypad or the touch screen provided in the apparatus 300 as illustrated in FIG. 1. The selected phrase can be automatically input next to the text that is already input, can replace some of the input text, or can be input to a predetermined position pointed at by the cursor.

Figure 4:
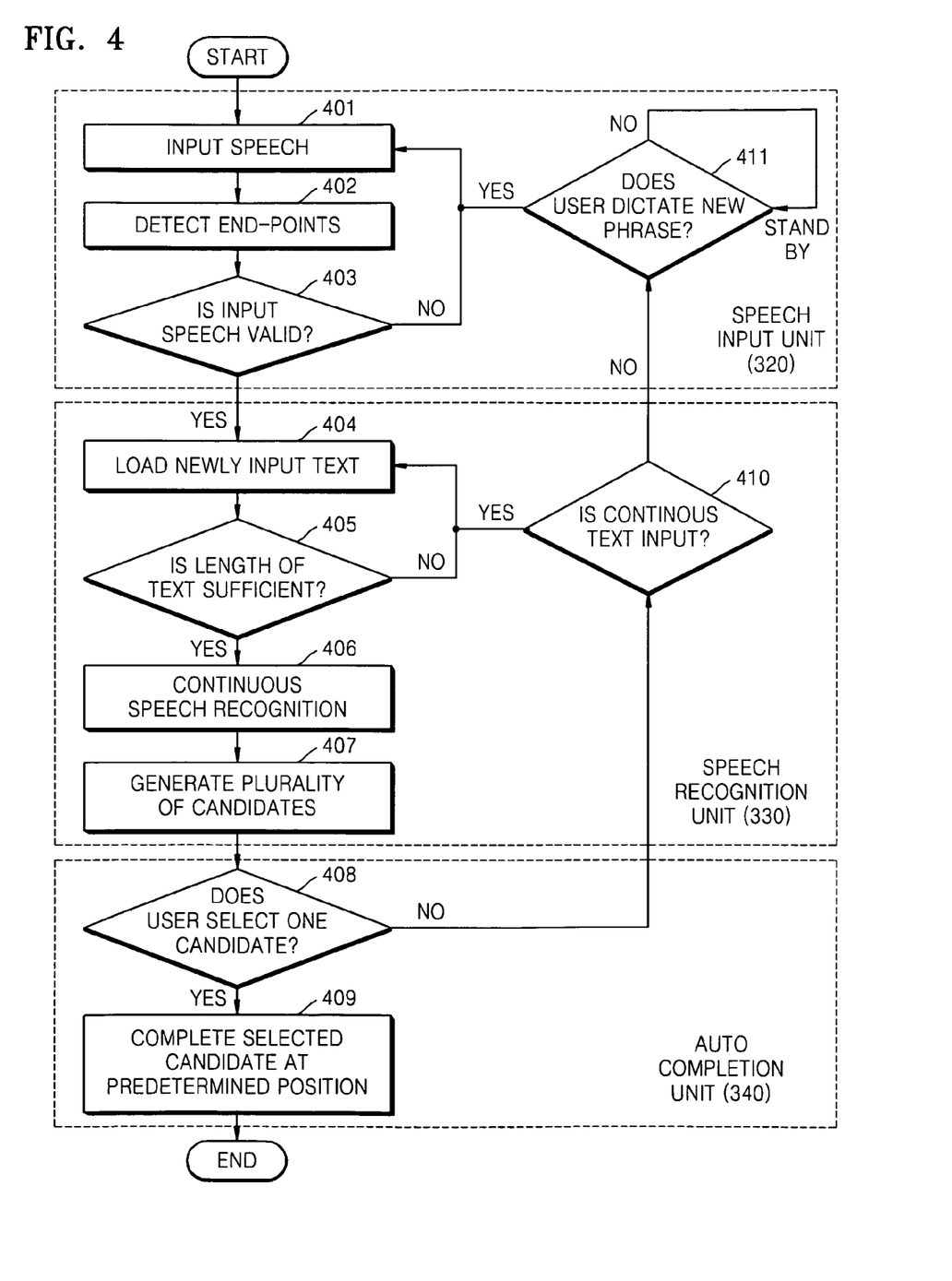
FIG. 4 is a flowchart illustrating a method of automatically completing a text input using speech recognition, according to an embodiment of the present invention.

FIG. 4 is a flowchart illustrating a method of automatically completing a text input using speech recognition, according to an embodiment of the present invention. Referring to FIG. 4, the speech input unit 320, the speech recognition unit 330, and the auto completion unit 340 of FIG. 3 are disposed according to the data processing flow of the method according to the present embodiment. FIG. 4 shows logical processes, which may be different from physical processes realized in hardware to some degree.

In FIG. 4, the speech input unit 320 receives a speech input (S401), detects end-points of the speech input (S402), and determines whether the input speech is valid (S403). These processes are the same as those described with reference to FIG. 3, and thus detailed descriptions thereof are not repeated here.

The speech recognition unit 330 loads the newly input text from the text input unit 310 (not shown) (S404), and determines whether the text has sufficient length (S405). If the text does not have sufficient length, the speech recognition unit 330 waits until text having sufficient length is input into the text input unit 310, and if the text has sufficient length, the speech recognition unit 330 tries to recognize the continuous speech (S406) and generates plurality of candidates (S407). These processes are the same those described with reference to FIG. 3, and thus detailed descriptions thereof are not repeated here.

The auto completion unit 340 determines whether the user selects one of the candidates generated by the speech recognition unit 330 (S408). If the user selects one of the phrases, the auto completion unit 340 completes the text input operation automatically on a predetermined position (S409). The predetermined position has been described with reference to FIG. 3.

On the other hand, if the user does not select one of the phrases in S408, there are two options for the user. The first option is a direct text input by the user using the text input unit 310 such as keypad, and the second option is to regenerate the plurality of candidates by dictating the phrase again. If the user does not select one of the phrases and inputs the text using the text input unit 310 in S408, it is identified whether the continuous text is input in S410. If the continuous text is input, S404 is performed by the speech recognition unit 330. That is, the continuous speech recognition is performed based on the newly input text. In this case, the speech recognition is performed based on the newly input text added to the previous text, and thus, the speech recognition rate will increase.

If it is determined that the user does not input the text in S410, it is identified whether the user dictates a new phrase in S411. If a new phrase is dictated, S401 is performed again by the speech input unit 320. However, since the text input unit 310 (not shown) and the speech input unit 320 operate separately from each other, the speech recognition can be performed from the operation of the speech input unit 320 after stopping the operation of the speech recognition unit 330 when the user dictates the new phrase, even though the speech recognition unit 330 has performed the speech recognition already based on the speech.

If the user does not select one of the candidates in S408, does not input the text in S410, and does not dictate a new phrase in S411, the apparatus 300 waits for an input from the user. In FIG. 4, the apparatus 300 waits for a new phrase to be dictated in S411; however, it is obvious to one of ordinary skill in the art that the apparatus 300 can wait for a text input as well as a new dictation. In addition, in S408, when the additional input is performed by the user, it can be freely determined whether the text input or the voice input is checked first according to the environment in which the apparatus 300 is used or the characteristics of the user.

Figure 5A:
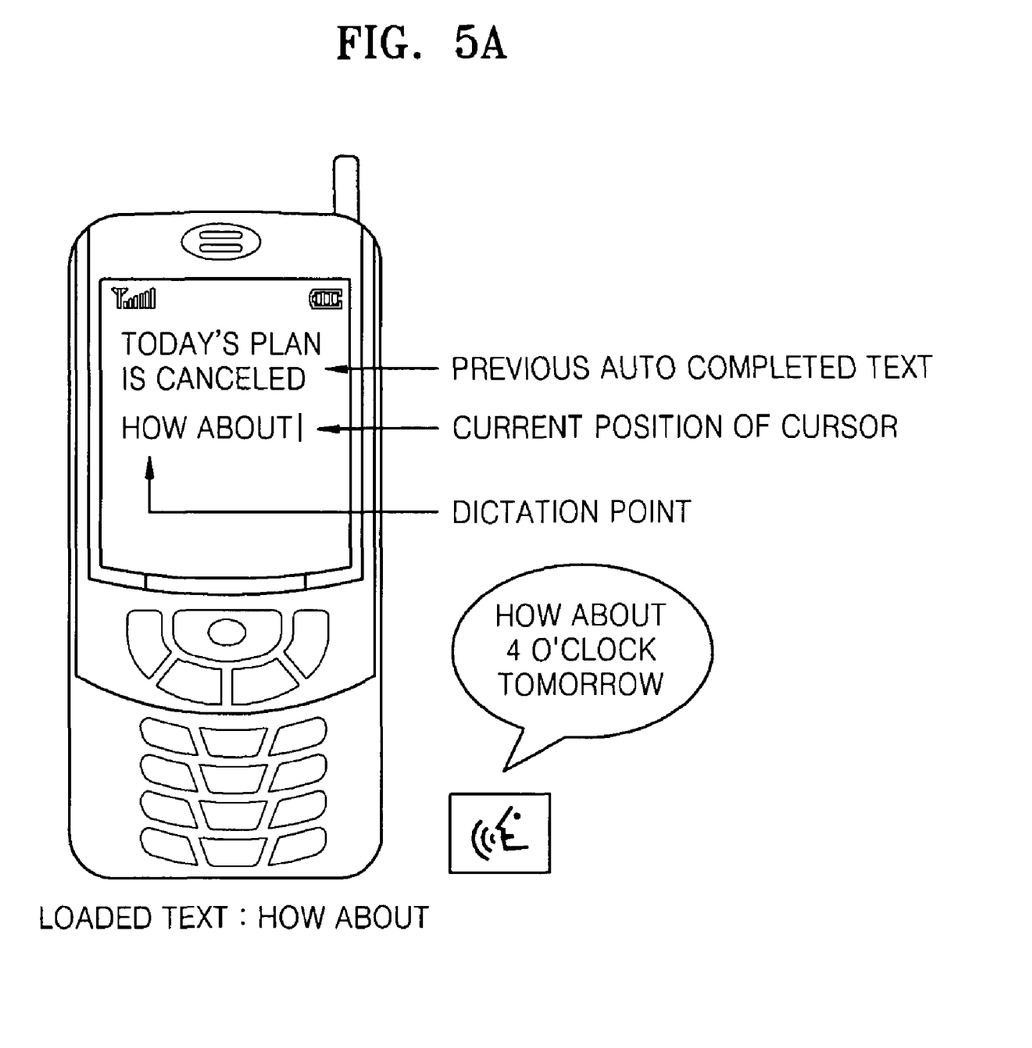
FIGS. 5A and 5B are diagrams illustrating a process of loading newly input text for performing speech recognition, according to an embodiment of the present invention.
Figure 5B:
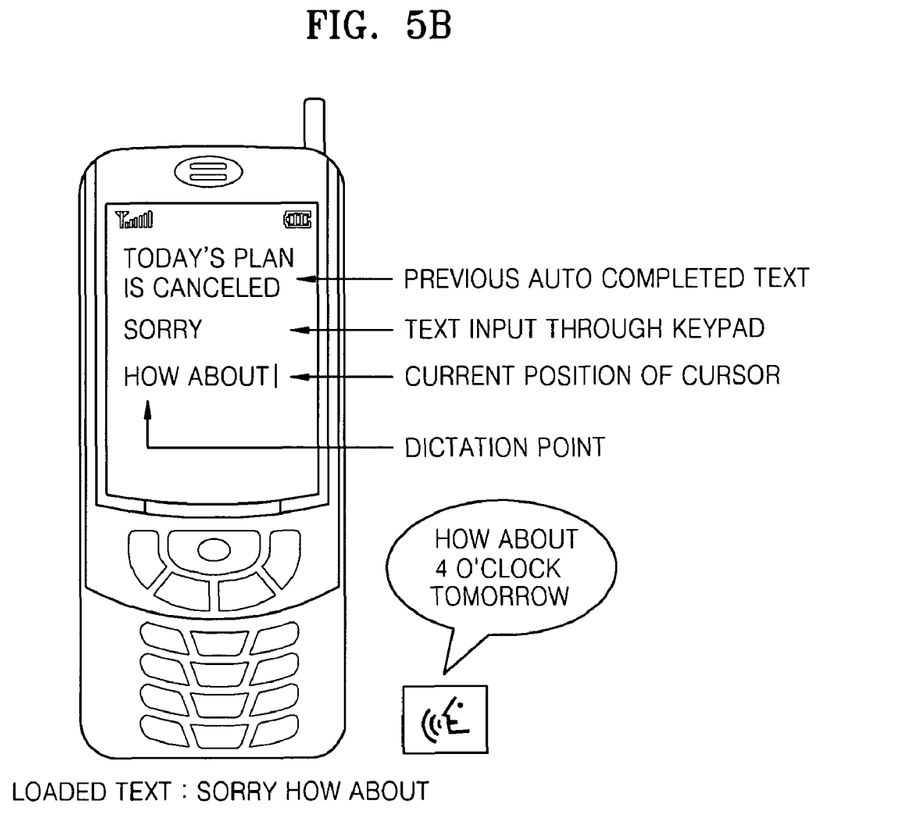

FIGS. 5A and 5B are diagrams illustrating a process of loading newly input text for performing speech recognition, according to an embodiment of the present invention. In the current embodiment of the present invention, loading of newly input text means that text that is additionally input after text that is automatically completed while repeating text input and e voice input operations is loaded.

In FIG. 5A, it is assumed that the text is newly input after the text "today's plan is canceled" that is already completed automatically. When the user dictates the phrase "how about 4 o'clock tomorrow", the speech recognition of the dictation of the user is performed based on the text "how about" that is located in front of the cursor in the input text.

On the other hand, in FIG. 5B, it is assumed that the user inputs a new text "sorry" after the completed text "today's plan is canceled" without performing the speech recognition, and then, the user inputs the text "how about" using the keypad while dictating the phrase "how about 4 o'clock tomorrow". In this case, the speech recognition is performed based on the text "sorry how about" that is newly input after the completed text "today's plan is canceled". In the present embodiment, in the loaded text "sorry how about", only the text "how about" corresponds to the dictation of the user and the text "sorry" does not relate to the speech recognition according to the dictation of the user. Therefore, when the speech recognition is performed based on the loaded text, a method of applying a weighted value to a certain portion of the text according to a predetermined rule will be described with reference to FIG. 5C.

Figure 5C:
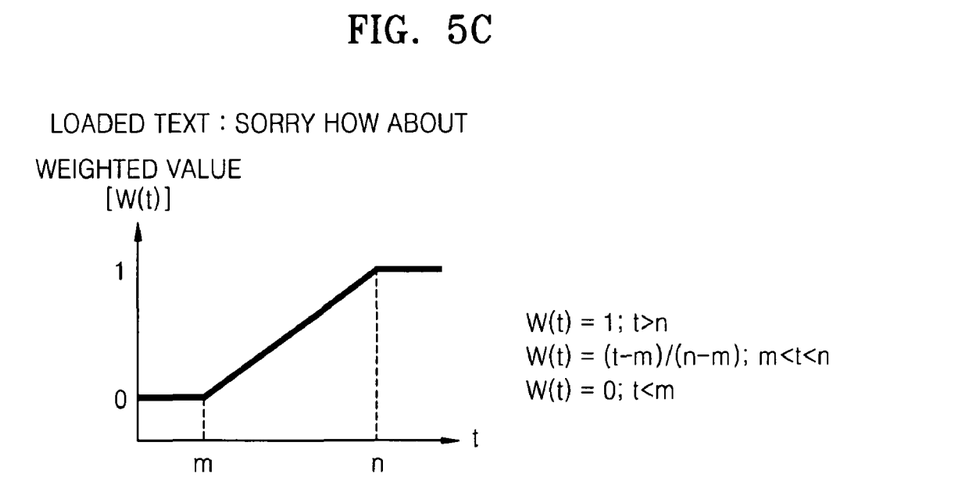
FIG. 5C is a diagram illustrating a process of applying a weighted value to loaded text, according to an embodiment of the present invention.

FIG. 5C is a diagram illustrating a method of applying the weighted value to the loaded text, according to an embodiment of the present invention. This idea comes from the fact that the user probably dictates the latest input text. That is, a weighted value that increases in proportion to the input order is applied to each of the phonemes, syllables, or words constructing the loaded text. In FIG. 5C, the weighted value applied to each of the words in the text varies from between 0 and 1 according to time. In the text "sorry how about" loaded to be used in FIG. 5C, the lowest weighted value close to 0 is applied to the word "sorry" that is input first, and the highest weighted value close to 1 is applied to the word "about" that is input last.

In addition, in consideration of the fact that the user generally dictates the text that is input later, it can be assumed that the user dictates the phrase "how above 4 o'clock tomorrow" with respect to the loaded text "sorry how about" in FIG. 5C. When the speech recognition is performed based on the loaded text "sorry how about", the speech recognition is performed based on the word to which the high weighted value is applied, for example, the word "about", and when the speech recognition is performed from the word "how", an accurate speech recognition result can be obtained. Therefore, when a weighted value according to time is applied to the text, the accuracy and effect of the continuous speech recognition can be improved.

The speech recognition unit grants scores, to which the weighted value is applied, to each of the words in the text to be recognized. When the weighted value is applied to each of the words in the text that is loaded while performing the continuous speech recognition as a penalty, the penalty of the word that is input prior to the other words increases and the score is lowered, and in some cases, words having a high penalty may be regarded as text that is not required to perform the speech recognition and may be pruned. Pruning means that a text is removed from the object to be recognized when the text is determined not to be text for performing the speech recognition. For example, in FIG. 5C, if the input of the text "sorry" and the input of the text "how about" are performed with a large timing interval therebetween, a very low weighted value is applied to the word "sorry", and thus, the text "sorry" can be pruned.

Figure 6:
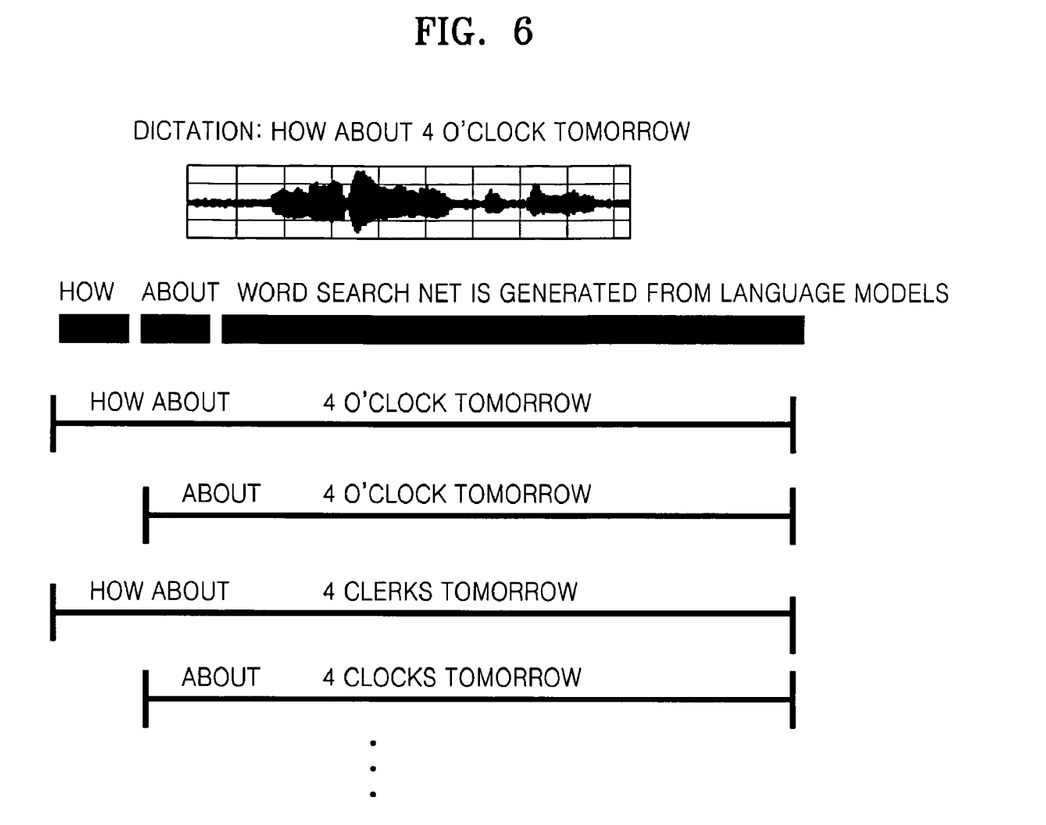
FIG. 6 is a diagram for explaining a process of generating candidates for recognizing continuous speech in speech recognition, according to an embodiment of the present invention.

FIG. 6 is a diagram for explaining a process of generating candidates for recognizing continuous speech in speech recognition, that is, a process of finding a starting point of text to be used to perform speech recognition according to an embodiment of the present invention. In general, a letter for starting the speech recognition can be an initial portion of every word; however, in some cases, the speech recognition can be started from a word corresponding to an important component except for words that are not required to recognize the content using a morpheme interpreter.

Referring to FIG. 6, in the current embodiment of the present invention, the speech recognition of the user's dictation "How about 4 o'clock tomorrow" is performed based on the loaded text "how about". In the loaded text "how about", the speech recognition can start from the word "how" and the word "about". A search net for the text that can be continued next to the text "how about" can include the words selected from commonly used language models. In the present embodiment, four or more possible automatic completion phrases are generated using combinations of each word in the text "how about" and the voice of the user. The candidate having the highest score among the generated candidates can be matched to the text, and then, a predetermined number of candidates are selected and transferred to the auto completion unit 340. The number of the candidates has been described above with reference to FIG. 3.

On the other hand, text input auto completion can be performed even if an error occurs in the speech recognition process described with reference to FIG. 6. For example, when the candidates transferred to the auto completion unit 340 are the text "How about 4 o'clock tomorrow" and the text "about 4 o'clock tomorrow", if the user selects the candidate "about 4 o'clock tomorrow" from the two candidates, the selected text "about 4 o'clock tomorrow" can substitute the word "about" in the input text "how about" and automatically be inputted into the position. Therefore, even if the speech recognition is performed based on the word "about" in the loaded text "how about" when the user dictates the phrase "how about 4 o'clock tomorrow", the above error can be compensated using the automatic text input process.

According to the present invention, text that is not yet input is completed based on a part of the text that is input through a text input device and speech recognition corresponding to the text, and thus, the inconvenience of direct input of text using a letter input device using a conventional text input method can be overcome. In addition, the text input and speech recognition processes are performed simultaneously in order to overcome the disadvantages of speech recognition caused by a low speech recognition rate and the strict timing order of speech recognition, and thus, both of the accuracy of the text input and the convenience of the speech recognition can be ensured. Therefore, continuous text that is not input can be input easily at a high speed based on the input letters and the recognized speech.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of automatically completing a text input, the method comprising:
   receiving a first part of a text from a user through a text input device;
   recognizing a speech of the user, which corresponds to the text; and
   completing a remaining part of the text based on the first part of the text and the recognized speech wherein
   the recognizing comprises:
      applying a weighted value to each of a plurality of words forming the input first part of the text in proportion to an input order of the words; and recognizing the speech in consideration of the weighted values applied to the words.

2. The method of claim 1, wherein the completion of the remaining part of the text comprises:
generating a plurality of candidates for a non-input part of the text based on the first part of the text and the recognized speech; and
determining the non-input part of the text from one of the candidates selected by the user among the plurality of candidates.

3. The method of claim 1, wherein the completion of the remaining part of the text comprises:
generating a plurality of candidates for a non-input part of the text based on the first part of the text and the recognized speech;
receiving an additional text from the user on recognizing the generated candidates; and
completing the remaining part of the text based on the input first part of the text, the recognized speech, and the additional text.

4. The method of claim 1, wherein the completion of the remaining part of the text comprises:
recognizing an additional speech of the user which corresponds to a part of the text that corresponds to the speech of the user; and
completing the remaining part of the text based on the input first part of the text and the additionally recognized speech.

5. A non-transitory computer readable recording medium having embodied thereon a computer program for executing the method according to one of claims 1 through 4.

6. An apparatus automatically completing a text input, the apparatus comprising:
a computer that executes:
a text input unit receiving a first part of a text from a user through a text input device;
a speech recognition unit recognizing a speech of the user, which corresponds to the text; and
an auto completion unit completing a remaining part of the text based on the input first part of the text and the recognized speech, wherein
the speech recognition unit applies a weighted value to each of a plurality of words forming the input first part of the text in proportion to an input order of the words, and recognizes the speech in consideration of the weighted values of the words.

7. The apparatus of claim 6, wherein the auto completion unit generates a plurality of candidates for a non-input part of the text based on the input first part of the text and the recognized speech, and determines the non-input part based on one of the candidates selected by the user among the plurality of candidates.

8. The apparatus of claim 6, wherein the auto completion unit generates a plurality of candidates for a non-input part of the text based on the input first part of the text and the recognized speech, receives an additional text from the user who recognizes the generated candidates, and completes the remaining part of the text based on the input first part of the text, the recognized speech, and the additional text.

9. The apparatus of claim 6, wherein the auto completion unit recognizes an additional speech of the user which corresponds to a part of the text corresponding to the speech of the user, and completes the remaining part of the text based on the input first part of the text and the additionally recognized speech.

* * * * *

UNITED STATES PATENT AND TRADEMARK OFFICE
CERTIFICATE OF CORRECTION

PATENT NO. : 7,970,612 B2
APPLICATION NO. : 12/004428
DATED : June 28, 2011
INVENTOR(S) : Ick-sang Han et al.

It is certified that error appears in the above-identified patent and that said Letters Patent is hereby corrected as shown below:

Column 8, Line 63, In Claim 1, after "speech" insert -- , --.

Signed and Sealed this
Nineteenth Day of June, 2012

David J. Kappos
*Director of the United States Patent and Trademark Office*